(12) United States Patent
Bruno et al.

(10) Patent No.: US 6,737,854 B2
(45) Date of Patent: May 18, 2004

(54) ELECTRICAL CURRENT MONITORING SYSTEM WITH IMPROVED CURRENT SENSOR CONFIGURATION

(75) Inventors: David Bruno, Portland, OR (US); Marc Bowman, McMinnville, OR (US)

(73) Assignee: Veris Industries, LLC, Portland, OR (US)

( * ) Notice: Subject to any disclaimer, the term of this patent is extended or adjusted under 35 U.S.C. 154(b) by 0 days.

(21) Appl. No.: 10/108,619

(22) Filed: Mar. 26, 2002

(65) Prior Publication Data

US 2003/0184279 A1 Oct. 2, 2003

(51) Int. Cl.⁷ .............................................. G01R 31/02
(52) U.S. Cl. .................................... 324/117 R; 324/126
(58) Field of Search ............................ 324/117 R, 126, 324/127, 142, 103 R; 340/870.01, 870.02, 870.03; 702/60, 62, 64, 65

(56) References Cited

U.S. PATENT DOCUMENTS 4,709,339 A * 11/1987 Fernandes ................... 700/293
6,373,238 B2   4/2002 Lewis et al. ................ 324/107

* cited by examiner

*Primary Examiner*—Vinh P. Nguyen
(74) *Attorney, Agent, or Firm*—Chernoff, Vilhauer, McClung & Stenzel, LLP

(57) ABSTRACT

A system for monitoring respective electrical currents in a plurality of conductors, such as wires. The system may include first and second current sensors, each suitable for sensing the current in a respective conductor. The first sensor may provide a first signal representative of the current it senses to a current monitor. The second signal may provide a second signal representative of the current it senses to the first current sensor, which in turn, may provide the second signal to the current monitor.

47 Claims, 8 Drawing Sheets

ELECTRICAL CURRENT MONITORING SYSTEM WITH IMPROVED CURRENT SENSOR CONFIGURATION

BACKGROUND OF THE INVENTION

The present invention relates to a current monitoring system.

Referring to FIG. 1, many electrical power distribution systems include a power panel enclosure 10 into which is provided electrical power using one or more sets of wires 12. The electrical power may have any voltage, any current, and any number of phases (e.g., single phase, two phases, or three phases). Each phase of the electrical power to the power panel is normally provided to a separate bus bar 14a, 14b, and 14c, which are normally elongate conductors within the power panel 10. A plurality of circuit breakers 16a, 16b, 16c, etc., which trip or otherwise selectively disconnect electrical power, are electrically interconnected between one or more of the bus bars 14a, 14b, and 14c, and respective loads 18 external to the power panel 10. In many power panels 10 the circuit breakers 16 are vertically aligned in one or more strips 20 and 22. When the load 18 interconnected to a respective circuit breaker 16 within the power panel 10 draws excessive electrical current then the circuit break 16 trips or otherwise disconnects the electrical power to the load 18. In this manner, if a load shorts and thereafter draws excessive current then the circuit breaker will trip.

In a business or residential environment a set of electrical loads, such as motors, outlets, heaters, lights, machinery, instrumentation, etc., may be electrically interconnected to a single circuit. When the electrical current provided to the loads from a single circuit is excessive then the respective circuit breaker(s) will disconnect the electrical power to all of the loads. Initially, the anticipated current requirements for all of the loads interconnected to a single circuit breaker (s) may be added together to ensure that the total load will be sufficiently below the rating for the circuit breaker. In this manner, the circuit breaker will not inadvertently trip with normal variations in the current drawn by the loads. However, after the initial installation of the loads and a suitable circuit breaker for those loads, additional loads are frequently added to existing circuits without sufficient consideration of the total existing load for the respective circuit breaker(s). If excessive additional loads are added to the circuit breaker(s), then the circuit breaker(s) will have a tendency to trip during normal operation. While this may be generally acceptable in a residential environment, in a business environment the unanticipated tripping of the circuit breaker, especially when none of the loads are actually shorted, is simply unacceptable.

For example, in a computer server farm environment five circuit breakers may each be electrically interconnected to five computer servers, having a total of twenty-five computer servers. If three additional computer servers are added to the computer server farm, they may be electrically interconnected to the same circuit breaker. Frequently the installer is in a hurry to install the three additional computer servers to the network and interconnects the additional three computer servers to any readily available power outlet. However, having eight computer servers electrically interconnected to a single circuit breaker, which is properly sized for only five computer servers, will likely result in tripping the circuit breaker during normal usage. This may be simply unacceptable for operating a computer server farm where uninterrupted service is important. In many cases, the power provider to the server farm guarantees up time of the power provided to the computer servers. In the event that the power is interrupted, the power provider may be required to pay a substantial financial penalty.

Referring to FIG. 2, to monitor the current levels of individual circuit breakers 16 a respective current sensor 20 may be interconnected to the wire on the load side of the respective circuit breaker 16. The outputs 22 of each of the current sensors 20 may be interconnected to a current monitor 24 which signals an alarm condition if the output of one of the current sensors is to high. The current sensors 20 may be interconnected to one or more current monitors. It takes considerable time to install, at significant expense, all of the current sensors 20. In addition, because of the significant number of individual wires 22 an installer has a significant tendency to interconnect the wires 22 to improper places within the current monitor 24 and in particular to mismatch pairs of wires 22 from the same current sensor 20 rending the current sensors 20 ineffective. Moreover, it is problematic to ensure that the wires 22 indicated by the installer that relate to a particular current sensor 20 actually are interconnected to the desired current sensor 20. Typically, an installer likewise programs the current monitor 24 to indicate which wires attached to its interface are associated with which circuit breaker, and thus which load. Without proper attachment of the matched pairs of wires and attaching the wires in the proper location, any information that may be obtained may be simply nonsensical and relate to the wrong load (circuit breaker(s)), respectively. In summary, the potential installation problems are significant, especially when installed by untrained technicians.

What is desired, therefore, is an effective electrical measurement system.

DETAILED DESCRIPTION OF THE PREFERRED EMBODIMENT

Figure 1:
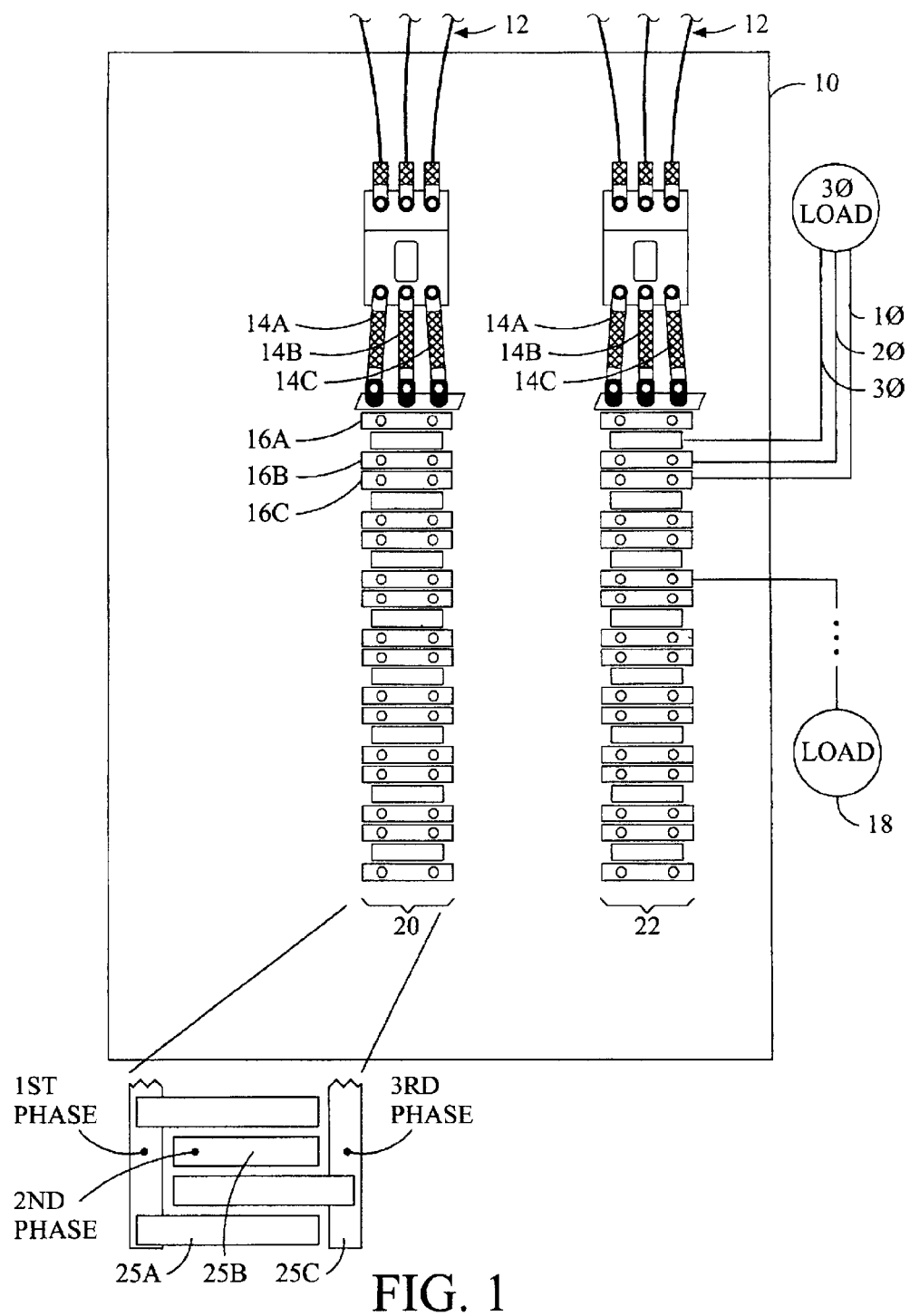
FIG. 1 illustrates a power panel with circuit breakers.
Figure 2:
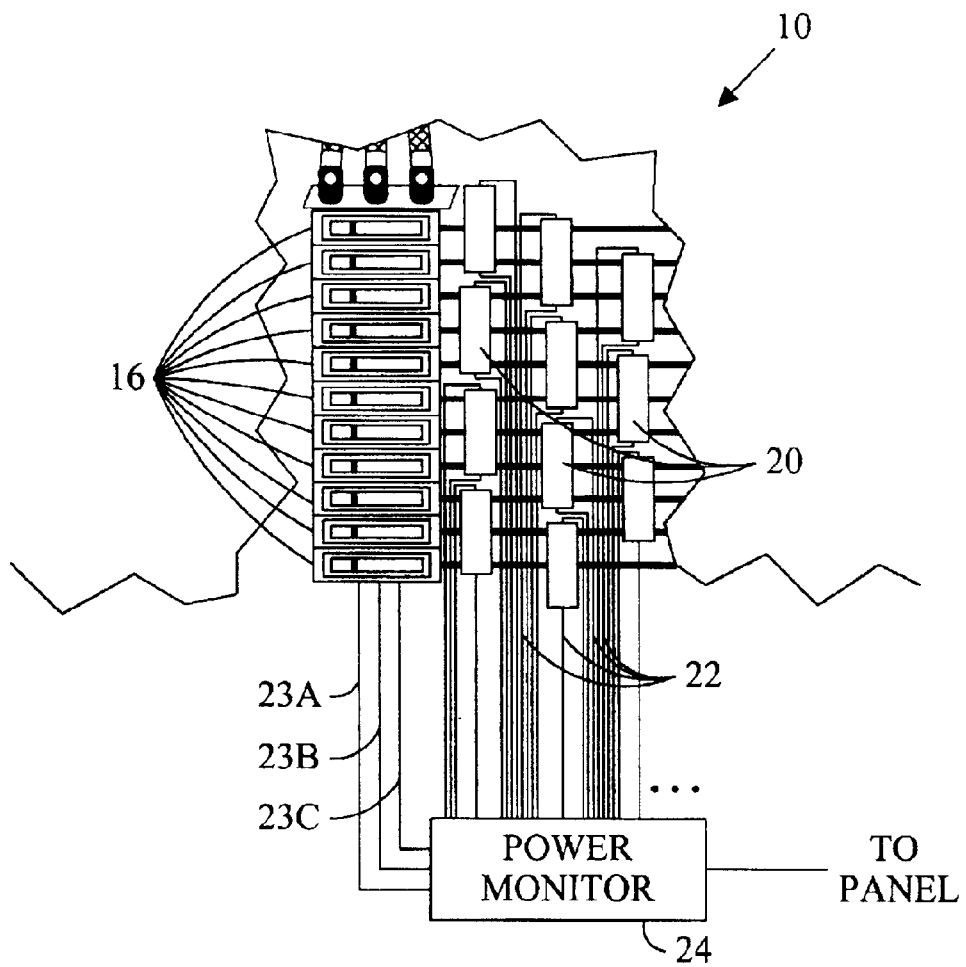
FIG. 2 illustrates circuit breakers and associated sensors.
Figure 3:
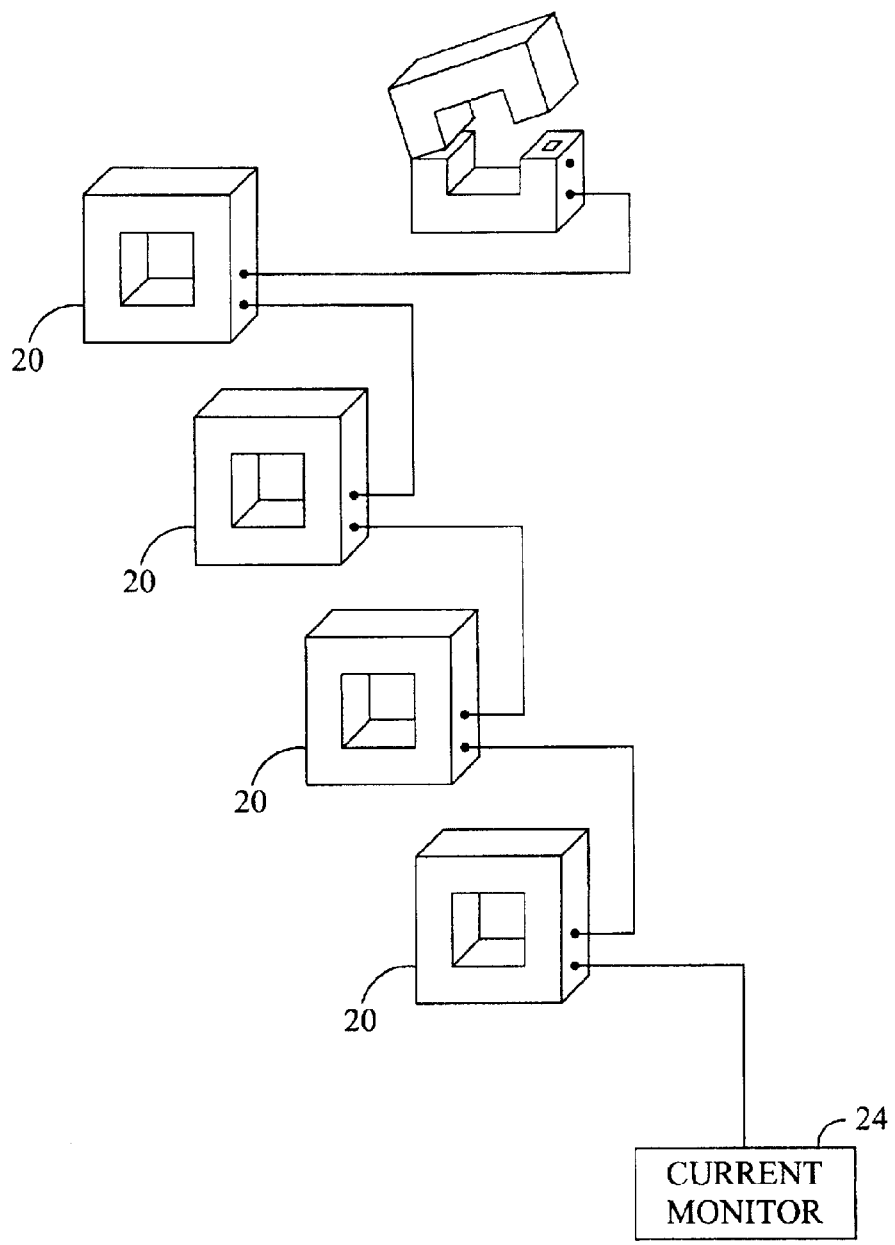
FIG. 3 illustrates a set of interconnected current sensors and a current monitor.
Figure 4:
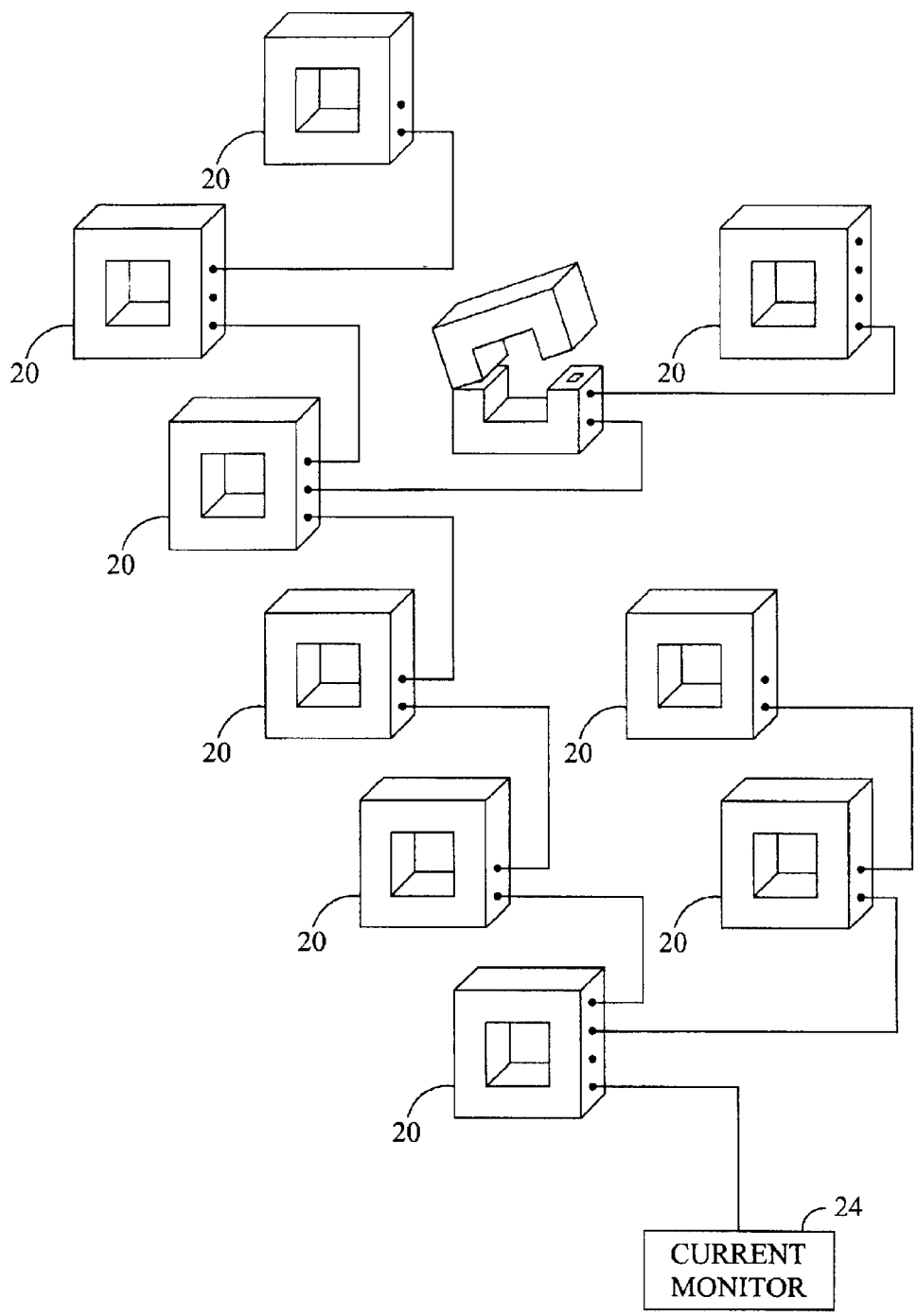
FIG. 4 illustrates an alternative set of interconnected current sensors and a current monitor.
Figure 5:
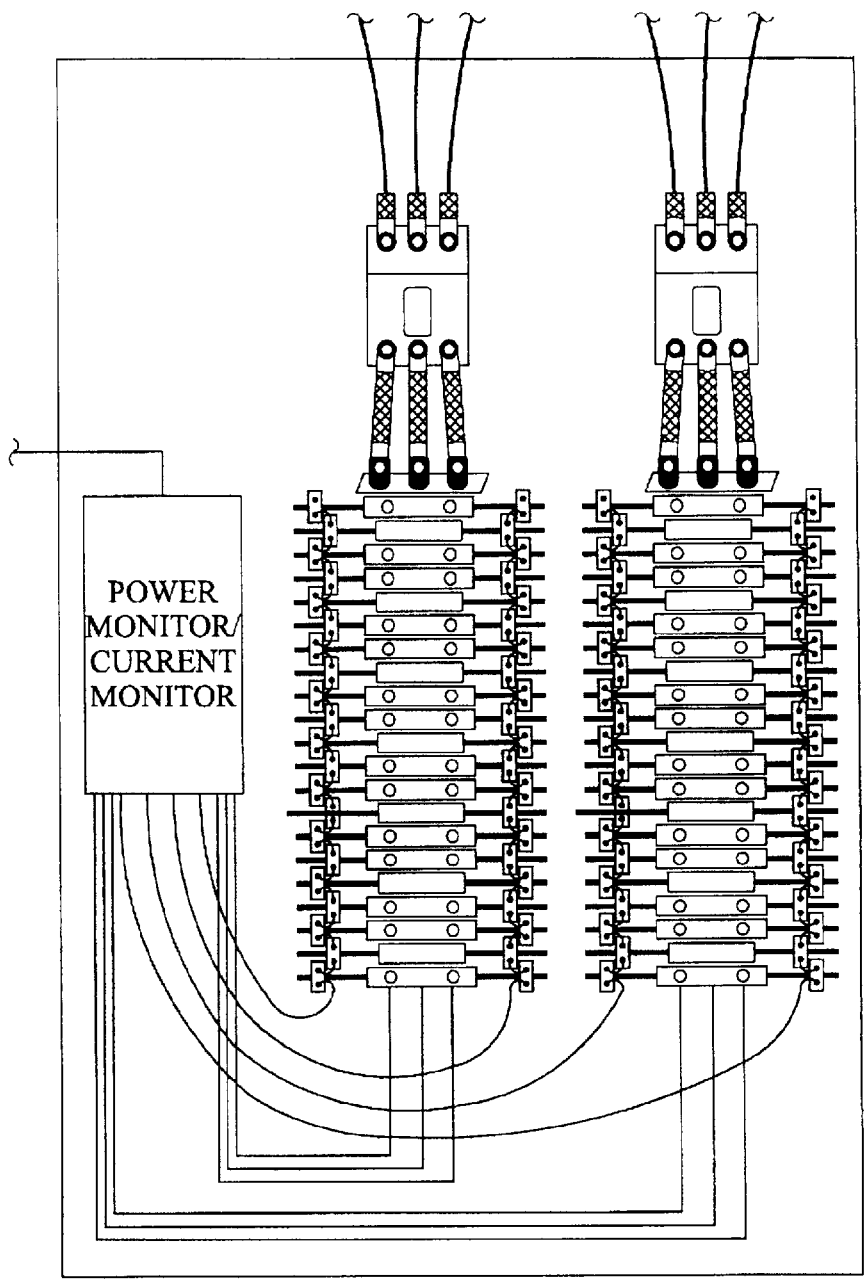
FIG. 5 illustrates a power panel with interconnected current sensors and a current monitor.

The present inventors reflected on the limitations inherent to using multiple current sensors for a set of circuit breakers within the power panel 10 and considered enclosing respective pairs of wires 22 in a single wire wrap to reduce the likelihood of mixing respective pairs together. Also, color coding of the respective pairs of wires 22 and corresponding color coding of the respective current sensors 20 would likewise reduce the likelihood that respective wires 22 and current sensors 20 would be mismatched. While such an arrangement is an improvement the present inventors still consider it burdensome to install multiple such sensor/wire combinations, relatively expensive, and remains prone to some likelihood of installation error. After considering the aforementioned limitations and potential improvements, referring to FIG. 3 the present inventors came to the realization that a set of current sensors interconnected together with respect to one another permits a significantly reduced amount of wires to be included in the limited space available within the power panel 10. Preferably, the sensors are free from being rigidly interconnected with respect to one another. Moreover, simply interconnecting the sensors together, preferably in a one-to-one daisy chained relationship, may decrease the likelihood of installation errors by technicians. Also, the current sensors 20 may be designed such that there is a fixed number of current sensors 20 permanently affixed together. Alternatively, the current sensors 20 may be detachably interconnectable to one another with each of the current sensors 20 having one or more interconnections, as illustrated in FIG. 4. The current monitor 24 and associated current sensors 20 may be interconnected to a set of wires from circuit breakers within a power panel, as illustrated in FIG. 5. It is to be understood that the current sensors may be solid core or otherwise split-core sensors that are readily installable around existing wires.

Unfortunately, merely interconnecting the sensors together, while sufficient, may result in difficulty properly differentiating and identifying the signal from one sensor with respect to other sensors. The interconnection between sensors and the signals passed by the interconnection may be time multiplexed, frequency multiplexed, included with an identification, other otherwise encoded using any suitable technique. In this manner each sensor may be uniquely identified in some manner and the signal from each sensor may be passed to the current monitor 24.

Figure 6:
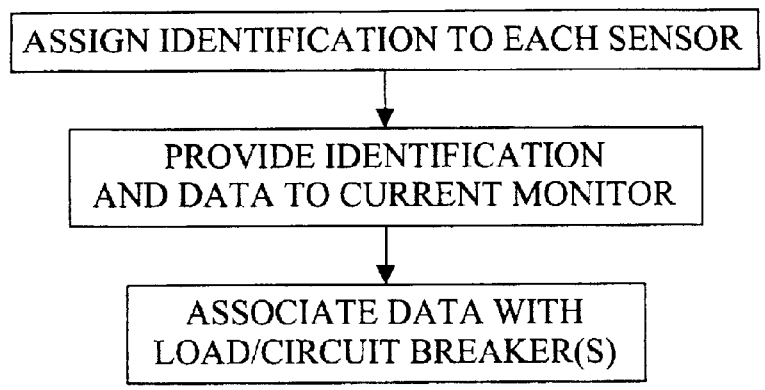
FIG. 6 illustrates one technique of providing data from the current sensors to the current monitor.

Referring to FIG. 6, one potential technique to provide unique identification for the signals from the sensors 20 is to assign an identification to each sensor 20, which may be unique if desired. The identification may be programmed into the sensor 20 from the manufacturer thereby ensuring that it will be unique, at least for the set of sensors interconnected to the current monitor 24. Alternatively, the identification may likewise be programmed by the user, or otherwise selected by a set of switches. The identification for each sensor 20 may be provided to the current monitor 24 together with the data from the current sensor 20. The current monitor 24 (or other device) may associate the data and identification with the particular load/circuit breaker(s) so that the current levels may be effectively monitored for particular loading situations. This permits the identification and measurement of different loading currents without requiring any particular order of installation of the devices.

In one embodiment the current sensors may include associated electronics, such as within the housings surrounding the current sensors, that each receive the signal from the current sensors and each provide an output signal in a suitable format, range of values, current, voltage, etc., for the current monitor 24. The associated electronics may receive their operational power from the induced current generated within the current sensor 20 which eliminates the need to provide power to the associated electronics. After further consideration, it was determined that self-powered associated electronics may not be capable of providing signals to the current monitor 24 when the associated load is drawing no power or otherwise the circuit breaker 18 has tripped thus preventing the flow of power to the load. Accordingly, the associated electronics are preferably powered partially or solely through the communication channel between the sensors 20. Alternatively, the associated electronics may be powered by a separate power connection between the sensors 20 or otherwise by a connection to an external power source that is not dependent on the power to the load.

While the identification of the signals from the current sensors provides a significant improvement, the system still relies on the technician to provide information relating which current sensor is interconnected with which particular load and/or circuit breaker. In the event that the technician misidentifies which particular sensor is interconnected with which particular load, then the information obtained by the current monitor 24 will be erroneous. In many installations the wires to which the current sensors are associated with are aligned in a linear relationship, such as those wires from a set of circuit breakers within a power panel. Moreover, typically the loads interconnected to particular circuit breakers are known with some reasonable degree of certainty because of the importance of interconnecting particular circuit breakers to particular loads. After consideration of these limitations and reasonable likelihoods, the present inventors came to the realization that the spatial relationship (spaced apart) between the different current sensors may be used as the basis to identify, preferably in a unique manner, each of the current sensors. Moreover, if the current sensors have the same or a related spatial relationship with the circuit breakers (e.g., wires) then the spatial relationship of the current sensors themselves may be used as the basis, at least in part, to identify the particular loads (circuit breakers). The spatial relationship relates to the order of interconnection of the current sensors.

Figure 7:
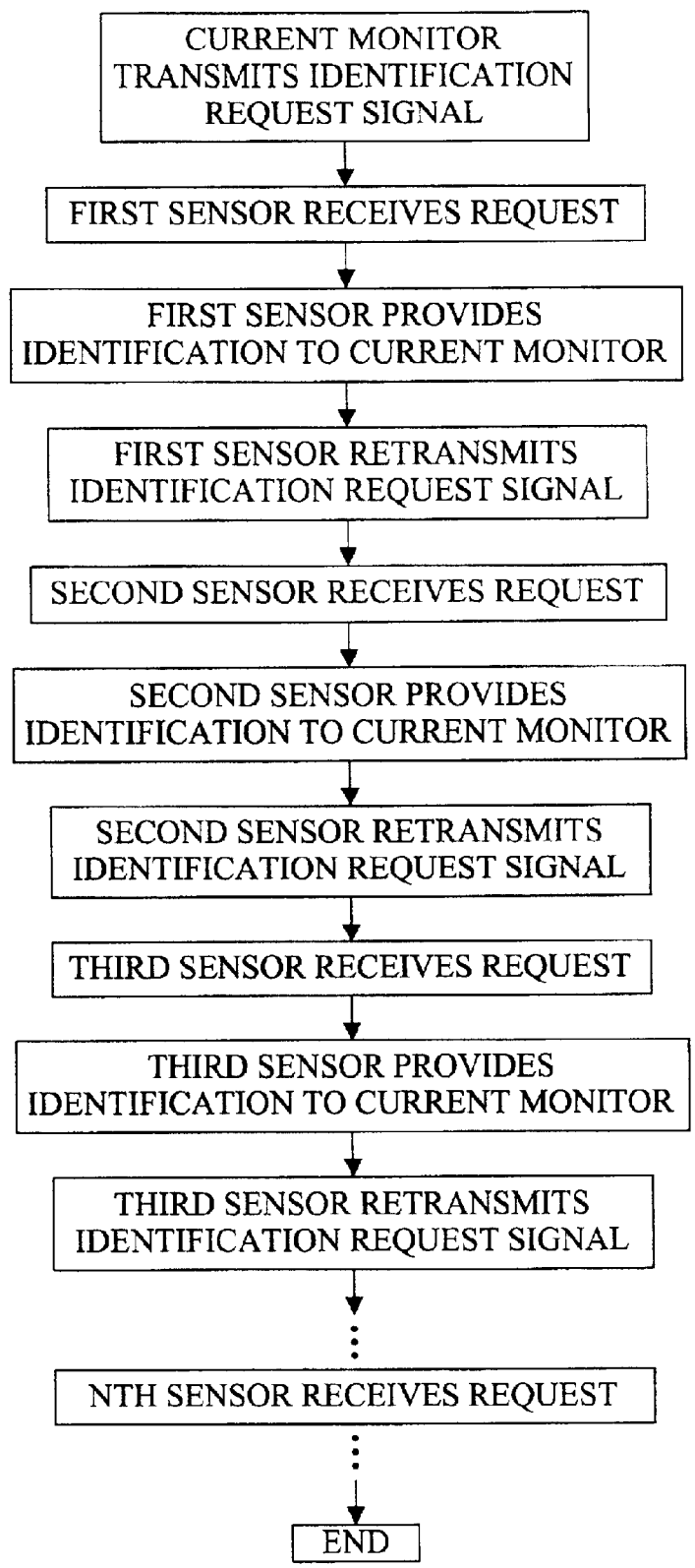
FIG. 7 illustrates one technique of determining the spatial relationship of a set of current sensors.

With these realizations in mind, the present inventors determined that the propagation of signals, such as for example an identification request signal, within the network of current sensors may be used as the basis of determining the relative position or interconnection order of each sensor in the chain. Referring to FIG. 7, the current monitor 24 preferably during setup transmits an identification request signal through the wires. The identification request may be transferred through the power wire, communication wire, or a separate identification wire. When the first sensor receives the identification request signal it provides in response to the current monitor 24 its identification, such as its serial number. In this manner, the current monitor 24 has the identification of the first current sensor 20 and its relative position to the current sensor 24, namely, the closest current sensor. The first current sensor, preferably after a time delay, retransmits the identification request signal to the next sensor. The next sensor, in response to receiving the identification request signal provides to the current monitor 24 its identification, such as its serial number. In this manner, the current monitor 24 has the identification of the second current sensor 20 and its relative position to the current sensor 24, namely, the second closest current sensor. The second sensor, preferably after a time delay, retransmits the identification request signal to the next sensor. The next sensor, in response to receiving the identification request signal provides to the current monitor 24 its identification, such as its serial number. In this manner, the current monitor 24 has the identification of the third current sensor 20 and its relative position to the current sensor 24, namely, the third closest current sensor. The third sensor, preferably after a time delay, retransmits the identification request signal to the next sensor. In this manner, the set of current sensors may be identified together with their relative positions. The technician may use this relative information to configure the current monitor by more accurately identifying the particular current sensors, by merely knowing their relative positions. This reduces the likelihood of error caused by improper wiring installation. Moreover, the sequence of response may then be used as the current sensors implicit addresses.

To provide effective monitoring of the current levels provided to the loads, the current monitor 24 may monitor the current levels of each of circuit breakers 16. For example, a circuit breaker may be sized to trip at current levels in excess of 50 amps. Different circuit breakers may likewise be sized to trip at different levels. Accordingly, the current monitor 24 permits setting the trip level for each of the circuit breakers, many of which may be different. The current monitor may provide a warning when a sensor senses a current level greater than a predetermined statistical measure of the trip value of the current sensor, such as 70%. This provides a warning to the operator that the loads on a particular circuit breaker are reaching the maximum levels. The current monitor may also provide an alarm when a sensor senses a current level greater than a greater predetermined statistical measure of the trip value of the current sensor, such as 80%. This provides an alarm condition to the operator that the loads on a particular circuit breaker are nearly at the maximum level and a reduction in the current requirements of the loads or otherwise the removal of a load is desirable. Similarly a low current warning, and a low current alarm may likewise be included. Normally, the low current warning and alarms indicate a defective breaker and whether the loads are turned off. The warnings and alarms may include a time component, such that the warning or alarm condition needs to be present for a period of time before the warning or alarm condition is activated.

The current monitor 24 may likewise be used to provide reasonable power sub-metering. The voltage levels are generally known, such as 110 or 120 volts at 50 or 60 hertz. Likewise, the power factor may be presumed to be a constant value or unity ("1"). The measured current levels from the sensor may be multiplied by the presumed voltage to determine the power. While not as accurate as having a true power monitoring system that measures the actual current and the actual voltage, together with the power factor, it does provide an indication as to the power being supplied to each load(s).

The current monitor 24 may likewise be used to monitor the load balance between the different phases of the power panel 10. Frequently, the circuit breakers may be interconnected to a single phase when the loads require 120 volts, interconnected to two phases when the loads require 240 volts, and interconnected to three phases when the loads require three phase power. For example, the first phase of the power panel 10 may be supplying 70 amps, the second phase of the power panel 10 may be supplying 30 amps, and the third phase of the power panel 10 may be supplying 150 amps. This significant imbalance in the current supplied by the different phases is sub-optimal. For example, the greater the current levels the greater the voltage drop from the power source to the power panel, which may result in significant variations in the voltage levels provided to the power panel from the three phase power source. By monitoring the current (or power) provided from each phase using the sensors, the loads may be redistributed between the different phases to re-balance the loads.

Referring again to FIGS. 3 and 4, the present inventors came to the realization that if the devices are implemented with a serial set of interconnections, then the failure of a single device in the chain could render the remaining devices incapable of communicating with the current monitor. Moreover, there is significant overhead required with transmitting a set of data through a serial connection of a set of devices, where each devices receives and retransmits the data To overcome these limitations potentially present with the system shown in FIGS. 3 and 4, the present inventors came to the realization that a combination of an identification signal path and a networked signal path would overcome such limitations.

Figure 8:
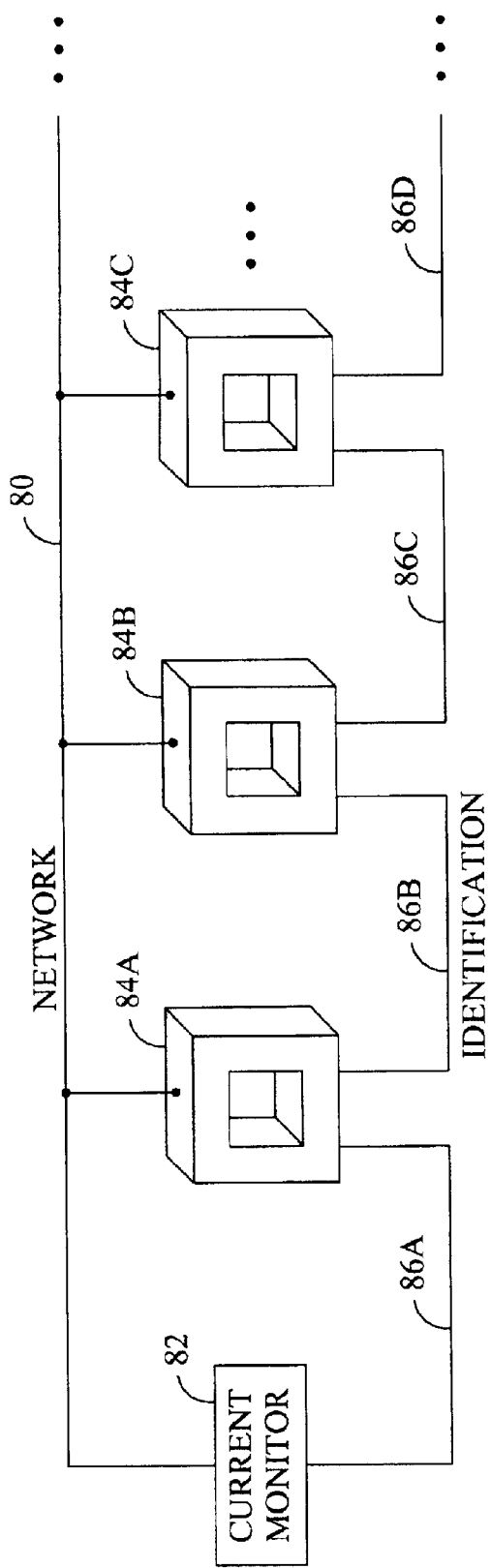
FIG. 8 illustrates another alternative set of interconnected current sensors and a current monitor.

Referring to FIG. 8, a network connection 80 may be used to transmit data between the current monitor 82 and any of the current sensors 84. Further, the network connection may be used to transmit data between the current sensors 84 themselves. The preferred network protocol is RS485. A set of identification connections 86 may be used to interconnect the current sensors 84 together. During configuration, the current monitor 84 transmits an identification request on the identification connection 86a. The current sensor 84a receives this identification request, and in response, provides its identification to the current monitor 82 on the network 80. The current sensor 84a transmits an identification request on the identification connection 86b. The current sensor 84b receives this identification request, and in response, provides its identification to the current monitor 82 on the network 80. The current sensor 84b transmits an identification request on the identification connection 86c. The current sensor 84c receives this identification request, and in response, provides its identification to the current monitor 82 on the network 80. The current sensor 84c transmits an identification request on the identification connection 86d This process is repeated throughout the set of current sensors 84. In this manner, the current monitor 80 receives the current sensor identifications in the order of connection. The identification request may be any signal, such as for example, a high voltage, a low voltage, a ground, a current signal, an encoded signal, a voltage pulse, a current pulse, an open circuit, a short circuit, a phase encoded signal, etc.

In the preferred embodiment the current sensors 84 include associated electronics to calculate the current levels and thus provide the resulting data to the current monitor 82. In this manner, the current monitor 82 does not need calibration data to scale the signals from different types or sizes of current sensors, or otherwise calibrate the data. Each of the current sensors 84 may be individually calibrated to provide accurate current measurements.

There exists the possibility that the measurement electronics associated with the current sensors may become damaged or otherwise cease to function properly. This is especially the case with a micro-controller is included with the measurement electronics. When the micro-controller ceases to function properly data will not be provided, or otherwise erroneous data will be provided, to the network 80. If the micro-controller is required to receive and transmit the identification request, then as in FIGS. 3 and 4, there may be a possibility that if a micro-controller is damaged then the remaining devices will not be identified properly for the current monitor. To avoid the potential possibility of a micro-controller malfunction impacting the identification process, the electronics for receiving and transmitting the identification request are preferably separate from the micro-controller. In other words, if the micro-controller is not operational or otherwise the electronics for sensing and providing data to the network 80 is not operating properly, the electronics for receiving and transmitting the identification request remains operational. In this manner, during the identification process an inoperative current sensor 84 will not prevent the identification of the remaining current sensors 84. In addition, a malfunctioning current sensor may be identified by repeating the identification process and identify the lack of an identification response from a particular current sensor. The malfunctioning current sensor may then be replaced or otherwise repaired. In addition, the lack of an operational current sensor may be identified so that the absence of an appropriate signal is not attributed to an inoperative load.

In one embodiment, the components associated with the identification process operate in such a manner that when the power to the current sensor is interrupted or otherwise not available, the default is to pass the identification request to the next current sensor. In this manner, even if the power to the device is not present, the current sensor still passes the identification request to additional current sensors so that the remaining current sensors may be properly identified.

The terms and expressions which have been employed in the foregoing specification are used therein as terns of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A system for monitoring current comprising:
   (a) a first current sensor suitable to sense a first current within a first wire;
   (b) a second current sensor suitable to sense a second current within a second wire;
   (c) said first current sensor providing a first signal representative of said first current to a current monitor; and
   (d) said second current sensor providing a second signal representative of said second current to said first current sensor which in turn provides said second signal to said current monitor.

2. The system of claim 1 further comprising:
   (a) a third current sensor suitable to sense a third current within a third wire;
   (b) said third current sensor providing a third signal representative of said third current to said second current sensor which in turn provides said third signal to said first current sensor which in turn provides said third signal to said current monitor.

3. The system of claim 2 further comprising:
   (a) a fourth current sensor suitable to sense a fourth current within a fourth wire; and
   (b) said fourth current sensor providing a fourth signal representative of said fourth current to said second current sensor which in turn provides said third signal to said first current sensor which in turn provides said third signal to said current monitor.

4. The system of claim 2 wherein said first sensor, said second sensor, and said third sensor, are free from being rigidly interconnected with respect to one another.

5. The system of claim 2 wherein said first sensor, said second sensor, and said third sensor are detachably interconnectable with respect to one another.

6. The system of claim 4 wherein said first sensor, said second sensor, and said third sensor are detachably interconnectable with respect to one another.

7. The system of claim 2 wherein said first sensor, said second sensor, and said third sensor include a respective split core.

8. The system of claim 1 wherein said first signal includes first identification of said first sensor and said second signal includes second identification of said second sensor.

9. The system of claim 8 wherein said first identification and said second identification are different.

10. The system of claim 8 wherein said first identification and said second identification are unique identifications.

11. The system of claim 1 wherein said first signal is associated with a first load and said second signal is associated with a second load.

12. The system of claim 11 wherein said current monitor associates said first signal with said first load and said second signal with said second load.

13. The system of claim 1 including first electronics associated with said first current sensor and second electronics associated with said second current sensor, said first and second electronics capable of respectively modifying said first and second signals provided to said current monitor, wherein said first and second electronics are powered by said first wire and said second wire, respectively.

14. The system of claim 1 including first electronics associated with said first current sensor and second electronics associated with said second current sensor, said first and second electronics capable of respectively modifying said first and second signals provided to said current monitor, wherein said first and second electronics are free from being solely powered by said first wire and said second wire, respectively.

15. The system of claim 1 including first electronics associated with said first current sensor and second electronics associated with said second current sensor, said first and second electronics capable of respectively modifying said first and second signals provided to said current monitor, wherein said first and second electronics second associated electronics of said second current sensor are free from being powered by said first wire and said second wire, respectively.

16. The system of claim 1 wherein said current monitor determines the order of interconnection between said first current sensor and said second current sensor.

17. The system of claim 1 wherein the spatial relationship between said first and second current sensors is associated with the spatial relationship between a set of circuit breakers.

18. The system of claim 16 wherein said order of interconnection is associated with the order of a set of circuit breakers, each circuit breaker associated with a respective load.

19. The system of claim 1 wherein said system determines an order of interconnection between said first current sensor and said second current sensor.

20. A system for monitoring current comprising:
   (a) a power panel;
   (b) a plurality of circuit breakers within said power panel;
   (c) a first current sensor suitable to sense a first current within a first wire interconnected with a first one of said circuit breakers;
   (d) a second current sensor suitable to sense a second current within a second wire interconnected with a second one of said circuit breakers;
   (e) said first current sensor providing a first signal representative of said first current to a current monitor; and
   (f) said second current sensor providing a second signal representative of said second current to said first current sensor which in turn provides said second signal to said current monitor.

21. The system of claim 20 wherein said first current sensor, said second current sensor, and said current monitor is within said power panel.

22. The system of claim 20 further comprising:
   (a) a third current sensor suitable to sense a third current within a third wire;
   (b) said third current sensor providing a third signal representative of said third current to said second current sensor which in turn provides said third signal to said first current sensor which in turn provides said third signal to said current monitor.

23. The system of claim 22 further comprising:
(a) a fourth current sensor suitable to sense a fourth current within a fourth wire; and
(b) said fourth current sensor providing a fourth signal representative of said fourth current to said second current sensor which in turn provides said third signal to said first current sensor which in turn provides said third signal to said current monitor.

24. The system of claim 22 wherein said first sensor, said second sensor, and said third sensor, are free from being rigidly interconnected with respect to one another.

25. The system of claim 22 wherein said first sensor, said second sensor, and said third sensor are detachably interconnectable with respect to one another.

26. The system of claim 24 wherein said first sensor, said second sensor, and said third sensor are detachably interconnectable with respect to one another.

27. The system of claim 22 wherein said first sensor, said second sensor, and said third sensor include a respective split core.

28. The system of claim 20 wherein said first signal includes first identification of said first sensor and said second signal includes second identification of said second sensor.

29. The system of claim 28 wherein said first identification and said second identification are different.

30. The system of claim 28 wherein said first identification and said second identification are unique identifications.

31. The system of claim 20 wherein said first signal is associated with a first load and said second signal is associated with a second load.

32. The system of claim 31 wherein said current monitor associates said first signal with said first load and said second signal with said second load.

33. The system of claim 20 including first electronics associated with said first current sensor and second electronics associated with said second current sensor, said first and second electronics capable of respectively modifying said first and second signals provided to said current monitor, wherein said first and second electronics second associated electronics of said second current sensor are powered by said first wire and said second wire, respectively.

34. The system of claim 20 including first electronics associated with said first current sensor and second electronics associated with said second current sensor, said first and second electronics capable of respectively modifying said first and second signals provided to said current monitor, wherein said first and second electronics second associated electronics of said second current sensor are free from being solely powered by said first wire and said second wire, respectively.

35. The system of claim 20 including first electronics associated with said first current sensor and second electronics associated with said second current sensor, said first and second electronics capable of respectively modifying said first and second signals provided to said current monitor, wherein said first and second electronics second associated electronics of said second current sensor are free from being powered by said first wire and said second wire, respectively.

36. The system of claim 20 wherein said current monitor determines the order of interconnection between said first current sensor and said second current sensor.

37. The system of claim 20 wherein the spatial relationship between said first and second current sensors is associated with the spatial relationship between a set of circuit breakers.

38. The system of claim 36 wherein said order of interconnection is associated with a set of loads.

39. The system of claim 20 wherein said system determines an order of interconnection between said first current sensor and said second current sensor.

40. A method for monitoring current comprising:
(a) providing a first current sensor suitable to sense a first current within a first wire;
(b) providing a second current sensor suitable to sense a second current within a second wire;
(c) providing a first signal from said first current sensor representative of said first current to a current monitor; and
(d) providing a second signal from said second current sensor representative of said second current to said first current sensor which in turn provides said second signal to said current monitor.

41. The method of claim 40 further comprising:
(a) providing a third current sensor suitable to sense a third current within a third wire;
(b) providing a third signal from said third current sensor representative of said third current to said second current sensor which in turn provides said third signal to said first current sensor which in turn provides said third signal to said current monitor.

42. The method of claim 41 wherein said current monitor provides an identification request signal to said first current sensor.

43. The method of claim 42 wherein said first current sensor receives said identification request signal and provides, in response thereto, identification data associated with said first sensor.

44. The method of claim 43 wherein said first current sensor provides said identification request signal to said second current sensor.

45. The method of claim 44 wherein said second current sensor receives said identification request signal and provides, in response thereto, identification data associated with said second current sensor.

46. The method of claim 45 wherein said current monitor receives identification data associated with said first current sensor prior to receiving identification data associated with said second current sensor.

47. The method of claim 46 wherein said current monitor associates said first current sensor as being interconnected to said current monitor between said second current sensor and said monitor.

* * * * *